T. F. DALTON.
PATCH BOLT.
APPLICATION FILED MAR. 21, 1914.

1,171,098.

Patented Feb. 8, 1916.

THOMAS F. DALTON
INVENTOR.

WITNESSES:

BY

ATTORNEYS.

UNITED STATES PATENT OFFICE.

THOMAS F. DALTON, OF CHICAGO, ILLINOIS, ASSIGNOR OF ONE-HALF TO WILLIAM J. SHEEHY, OF CHICAGO, ILLINOIS.

PATCH-BOLT.

1,171,098.  Specification of Letters Patent.  Patented Feb. 8, 1916.

Application filed March 21, 1914. Serial No. 826,383.

*To all whom it may concern:*

Be it known that I, THOMAS F. DALTON, a citizen of the United States, residing at Chicago, in the county of Cook and State of Illinois, have invented certain new and useful Improvements in Patch-Bolts, of which the following is a specification.

This invention relates to bolts for attaching patches to steam boilers, tanks and other containers, and its object is to provide a simple and efficient bolt of this kind which can be easily and quickly applied, and which is provided with means whereby it is securely held in place.

Figure 1:
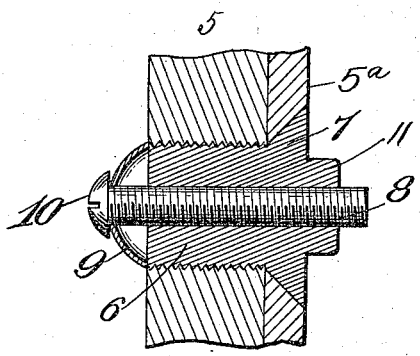
Figure 2:
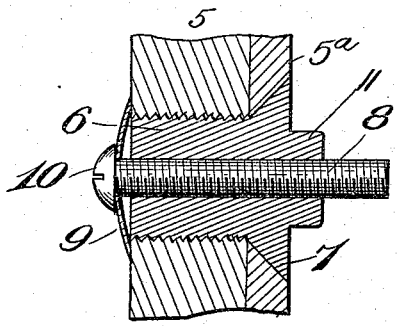
Figure 3:
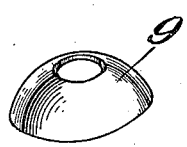

In the accompanying drawing, forming a part of this specification, Figure 1 is a sectional view of the device in the wall of the container, before it is finally positioned therein; Fig. 2 is a similar view showing the final position of the device, and Fig. 3 is a perspective view of a washer employed in connection with the device.

Referring specifically to the drawing, 5 denotes the wall of a boiler or other fluid container provided with a patch 5ª which is secured by my improved bolt. Said bolt is indicated at 6, and as shown, it has a countersunk head 7 similar to any ordinary patch bolt. A screw 8 is threaded through the bolt, and a washer 9 is held between the head 10 of the screw and the inner surface of the wall 5. The bolt is drilled and tapped through the center to receive the screw, the threads of the latter running opposite to the external threads of the bolt. The washer is dished or cup-shaped.

In applying the bolt the wall 5 and the patch 5ª are tapped to receive the bolt 6, the patch being countersunk to receive the head 7. The washer 9 is run up on the screw 8 and the latter is threaded through the bolt until the washer comes between the inner end of the bolt and the head 10 of the screw. The length of the screw is such that it projects from the head 7 a sufficient distance to permit the application of pliers or some other tool for turning the same. The bolt 6 is now screwed into the wall 5 and the patch 5ª until its head is flush with the outside of the patch, and the screw 8 is drawn to flatten the washer and spread the same against the wall 5 over the inner end of the bolt. The head of the bolt has an angular lug 11 to permit the application of a wrench for turning the bolt. The projecting end of the screw and the part 11 may be cut off flush with the patch so as to leave no projecting parts. The washer effectually prevents leakage as it completely covers the inner end of the bolt, and it also securely holds the bolt and prevents it from being blown out. The diameter of the head 10 of the screw 8 does not exceed the diameter of the bolt 6, and before the washer 9 is flattened its diameter also does not exceed the diameter of the bolt, as shown in Fig. 1. Thus, the screw and the washer may be applied to the bolt, and inserted with the latter through the tapped hole in the wall 5 and the patch 5ª.

I claim:

A patch bolt having a head to hold a patch, and threaded externally to screw into the part to which the patch is applied, and said bolt having a threaded axial bore extending throughout its entire length, a screw threaded through said bore and of a length to project from both ends of the bolt, and an expansible washer on the screw between its head and the inner end of the bolt, the diameter of the screw head and the diameter of the washer before the latter is expanded not exceeding the diameter of the bolt, and said washer when expanded having a greater diameter than that of the bolt.

In testimony whereof I affix my signature in presence of two witnesses.

THOMAS F. DALTON.

Witnesses:
 WILLIAM J. SHEEHY,
 S. J. LEHRER.

Copies of this patent may be obtained for five cents each, by addressing the "Commissioner of Patents, Washington, D. C."